United States Patent
Ueno

(10) Patent No.: US 7,372,815 B2
(45) Date of Patent: May 13, 2008

(54) LOAD DISTRIBUTING METHOD AMONG GATEKEEPER

(75) Inventor: Tetsuya Ueno, Tokyo (JP)

(73) Assignee: NEC Corporation, Tokyo (JP)

( * ) Notice: Subject to any disclaimer, the term of this patent is extended or adjusted under 35 U.S.C. 154(b) by 868 days.

(21) Appl. No.: 09/912,485

(22) Filed: Jul. 26, 2001

(65) Prior Publication Data

US 2002/0015383 A1    Feb. 7, 2002

(30) Foreign Application Priority Data

Aug. 1, 2000   (JP)   ............................ 2000-233504

(51) Int. Cl.
*H04L 12/28*   (2006.01)

(52) U.S. Cl. ................. 370/237; 370/352; 370/400; 709/227; 709/244

(58) Field of Classification Search ............... 370/237, 370/352, 230, 231, 235, 400; 709/227, 239, 709/240, 244
See application file for complete search history.

(56) References Cited

U.S. PATENT DOCUMENTS

| | | | |
|---|---|---|---|
| 6,229,804 B1 * | 5/2001 | Mortsolf et al. ............ | 370/352 |
| 6,604,142 B1 * | 8/2003 | Bertrand et al. ............ | 709/227 |
| 6,614,902 B1 * | 9/2003 | Rizzetto ................. | 379/265.11 |
| 6,738,383 B1 * | 5/2004 | Kliland et al. .............. | 370/401 |
| 6,788,692 B1 * | 9/2004 | Boudreau et al. ........... | 370/400 |
| 6,795,867 B1 * | 9/2004 | Ma et al. .................... | 709/240 |

FOREIGN PATENT DOCUMENTS

| | | |
|---|---|---|
| EP | 1 014 633 A2 | 6/2000 |
| JP | 5-210643 | 8/1993 |
| JP | 7-152702 | 6/1995 |
| JP | 7-235939 | 9/1995 |
| JP | 11-284667 | 10/1999 |
| JP | 2000-32146 | 1/2000 |

\* cited by examiner

*Primary Examiner*—Chi Pham
*Assistant Examiner*—Donald L Mills
(74) *Attorney, Agent, or Firm*—McGinn IP Law Group, PLLC

(57) ABSTRACT

A gatekeeper connected to an H323 network, includes a first message receiving section, a transport data transmitting section, and a control section. The first message receiving section receives a gatekeeper discovery message from an end point. The control section determines whether the gatekeeper has the lightest load among a plurality of gatekeepers including the gatekeeper, and controls the transport data transmitting section to transmit transport data to the end point in response to the gatekeeper discovery message, when it is determined that the gatekeeper has the lightest load.

26 Claims, 2 Drawing Sheets

LOAD DISTRIBUTING METHOD AMONG GATEKEEPER

BACKGROUND OF THE INVENTION

1. Field of the Invention

The present invention relates to a gatekeeper and a load distributing method.

2. Description of the Related Art

In the so-called H323 network, i.e., a packet network in which service quality is not guaranteed and which is defined in H323 recommendation of the ITU, address conversion and access control are provided to an end point on the network by a gatekeeper (GK). The end point is a terminal like s personal computer. The end point on such an H323 network issues a gatekeeper discovery message to gatekeepers (GKs) on the network to look for one gatekeeper (GK) in which data of the end point is registered. When the plurality of gatekeepers (GKs) exist on the H323 network, each of the plurality of gatekeepers (GKs) receives the gatekeeper discovery message and sends back to the end point, a message indicating that the gatekeeper is possible to register the data. When receiving from the plurality of gatekeepers (GKs), the messages indicating that the registration is possible, the end point selects one of the plurality of gatekeepers (GKs) and carries out a subsequent process to the selected gatekeeper (GK).

In this way, in the conventional H323 network, when receiving the gatekeeper discovery message from the end point, the gatekeeper (GK) sends back the registration possible message to the end point, if the gatekeeper (GK) is possible to register the data of the end point regardless of the condition of other gatekeepers (GKs). Therefore, there is a possibility that the load of a specific one of the plurality of gatekeepers (GKs) on the H323 network becomes heavy. In this case, the loads of some gatekeepers (GK) become high extraordinarily, compared with the others, and the load of some gatekeepers (GK) become low extraordinarily, compared with the others. In such a case, though there is the plurality of gatekeepers (GKs) on the H323 network, the processing ability of each gatekeeper (GK) is not sufficiently utilized.

In conjunction with the above description, a distributed data processing system is disclosed in Japanese Laid Open Patent application (JP-A-Heisei 7-152702). In this reference, the distributed data processing system is composed of a plurality of terminal apparatuses and a plurality of data processing apparatuses possible to respond to processing requests from the terminal apparatuses, which are connected with the terminal apparatuses through a network. The data processing apparatus has a load situation monitoring section and a load data transmitting section. The load situation monitoring section generates load data showing its own load situation. The load data transmitting section transmits back the load data obtained by the load situation monitoring section in accordance with the request from the terminal apparatus. One data processing apparatus as a data management data processing apparatus has a load data management section and a load data inquiry processing section in addition to the load situation monitoring section and the load data transmitting section. The load data management section manages the load data in the plurality of data processing apparatuses. The load data inquiry processing section notifies the load data in accordance with an inquiry about the load data, which are managed by the load data management section. Each of the plurality of terminal apparatus has a first load data inquiry section which inquires the load data managed by the load data management section of the management data processing apparatus in case of a specific operation, a load data memory section which stores the load data notified from the first load data inquiry section in accordance with the load data inquiry from the first load inquiry processing section, and a load distribution control unit which distributes the loads of the processing requests to the data processing apparatuses based on the load data of the data processing apparatuses stored in the load data memory section.

Also, an automatic call delivering system and a communication network is disclosed in Japanese Laid Open Patent Application (JP-P2000-32146A). In this reference, a call from a customer is routed to one or more service agents. A gateway is provided to receive a telephone call in the public telephone line network, and a gatekeeper is connected to the gateway through a computer network. The gatekeeper delivers the call from the gateway to one of a plurality of agent terminals connected to the computer network to connect one service agent with the customer. An automatic call delivering server is connected to the computer network, and determines when the agent is usable, and instruct the gatekeeper to route the agent terminal, which is usable from the gateway.

Also, a traffic distributing apparatus is disclosed in Japanese Laid Open Patent Application (JP-A-Heisei 7-235939). In this reference, the traffic distributing apparatus is composed of a plurality of networks (3), a terminating unit (2) connected to each network (3) and transmitting and receiving a communication frame and a routing frame, and a plurality of relaying units (1) interconnecting the plurality of networks to relay the frame. Each relaying unit (1) is composed of a receiving section (11), a detecting section (15), a routing frame processing section (12), and a transmitting section (14). The receiving section (11) receives the communication frame and the routing frame transmitted from the terminating unit of a transmission source. The detecting section (15) detects a traffic amount of frames transmitted to the network of a transmission destination. The routing frame processing section (12) produces the routing frame to notify to the terminating unit of each network At this time, routing frame includes information of network entity title indicative of a medium call control address indicating an access point where the relaying unit is connected to the network and an address allocated to the relaying unit. Also, the routing frame processing section (12) produces the routing frame indicative of another relaying unit when the traffic amount exceeds a predetermined value. The transmitting section (14) transmits the communication frame to the transmission destination terminating unit and transmits the routing frame indicating the other relaying unit from the routing frame processing section to the transmission source terminating unit (2).

SUMMARY OF THE INVENTION

Therefore, an object of the present invention is to provide a gatekeeper and a load distributing method, in which the load of the processing of end points can be efficiently distributed.

Another object of the present invention is to provide a gatekeeper and a load distributing method, in which in an H323 network, it can be prevented that the load concentrates to a specific gatekeeper so that the efficiency is reduced.

In an aspect of the present invention, a gatekeeper connected to an H323 network, includes a gatekeeper discovery message receiving section, a transport data transmitting section, and a control section. The gatekeeper discovery message receiving section receives a gatekeeper discovery message from an end point. The control section determines whether the gatekeeper has the lightest load among a plurality of gatekeepers including the gatekeeper, and controls the transport data transmitting section to transmit transport data to the end point in response to the gatekeeper discovery message, when it is determined that the gatekeeper has the lightest load.

The control section controls the transport data transmitting section not to transmit transport data in response to the gatekeeper discovery message, when it is determined that the gatekeeper does not have the lightest load.

Also, the control section may include a storage section and a first control section. The storage section stores a load state list indicative of existence of any of the plurality of gatekeepers having lighter loads than the gatekeeper. The first control section refers to the load state list to determine whether the gatekeeper has the lightest load among the plurality of gatekeepers including the gatekeeper, and controls the transport data transmitting section to transmit transport data to the end point in response to the gatekeeper discovery message, when it is determined that the gatekeeper has the lightest load.

In this case, the control section may further include a load state notice message receiving section, a calculating section, and a second control section. The load state notice message receiving section receives a load state notice message from one of the plurality of gatekeepers as a notice transmitting gatekeeper, the load state notice message including a load of the notice transmitting gatekeeper. The calculating section which calculates a load of the gatekeeper as a self-load. The second control section extracts the load of the notice transmitting gatekeeper from the load state notice message, and compares the extracted load and the self-load, and writes an identifier of the notice transmitting gatekeeper at least into the load state list, when the extracted load is lighter than the self-load.

In this case, the control section may further include a load state request message transmitting section. The second control section controls the load state request message transmitting section to transmit a load state request message with an identifier of the gatekeeper and the self-load to each of the plurality of gatekeepers. Each of the plurality of gatekeepers selectively replies the load state notice message to the gatekeeper based on a load of each of the plurality of gatekeepers.

In this case, the control section may further include a load state request message receiving section and a load state notice message transmitting section. The load state request message receiving section receives the load state request message with an identifier of each of the plurality of gatekeepers and the load of each gatekeeper. The second control section extracts the load of each gatekeeper from the load state request message, and compares the extracted load and the self-load, and controls the load state notice message transmitting section to transmit a load state notice message with the self-load and the identifier of the gatekeeper to each gatekeeper, when the extracted load is lighter than the self-load.

Also, the second control section discards the load state request message, when the extracted load is not lighter than the self-load.

In another aspect of the present invention, a load distributing method is applied to a communication system which include a network; an end point operatively connected to the network; and a plurality of gatekeepers including first and second gatekeepers. The method is attained by (a) receiving a gatekeeper discovery message from the end point in the first gatekeeper; by (b) referring to a load state list which indicates identifiers of ones having lighter loads, of the plurality of gatekeepers, in the first gatekeeper to determine whether the first gatekeeper has the lightest load among the plurality of gatekeepers; and by (c) transmitting transport data to the end point in response to the gatekeeper discovery message in the first gatekeeper, when it is determined that the gatekeeper has the lightest load.

The load distributing method may further include the step of: (d) ignoring the gatekeeper discovery message, when it is determined that the gatekeeper does not have the lightest load.

Also, the load distributing method may be attained by further including the steps of: calculating a load of the first gatekeeper as a first load; receiving a load state notice message including a load of the second gatekeeper as a second load from the second gatekeeper; extracting the second load from the load state notice message; comparing the first load and the second load; and writing an identifier of the second gatekeeper into the load state list, when the second load is lighter than the first load.

Also, a load state request message with an identifier of the first gatekeeper and the first load may be transmitted to the second gatekeeper.

Also, the load distributing method may be attained by further include the steps of: receiving the load state request message with an identifier of the second gatekeeper and the second load; extracting the second load from the load state request message; comparing the extracted second load and the first load; and transmitting a load state notice message with the first load and the identifier of the first gatekeeper to the second gatekeeper, when the extracted second load is lighter than the first load.

In this case, the load state request message may be discarded, when the extracted second load is hot lighter than the first load.

DESCRIPTION OF THE PREFERRED EMBODIMENTS

Hereinafter, a gatekeeper and a load distributing method of the present invention will be described with reference to the attached drawings.

Figure 1:
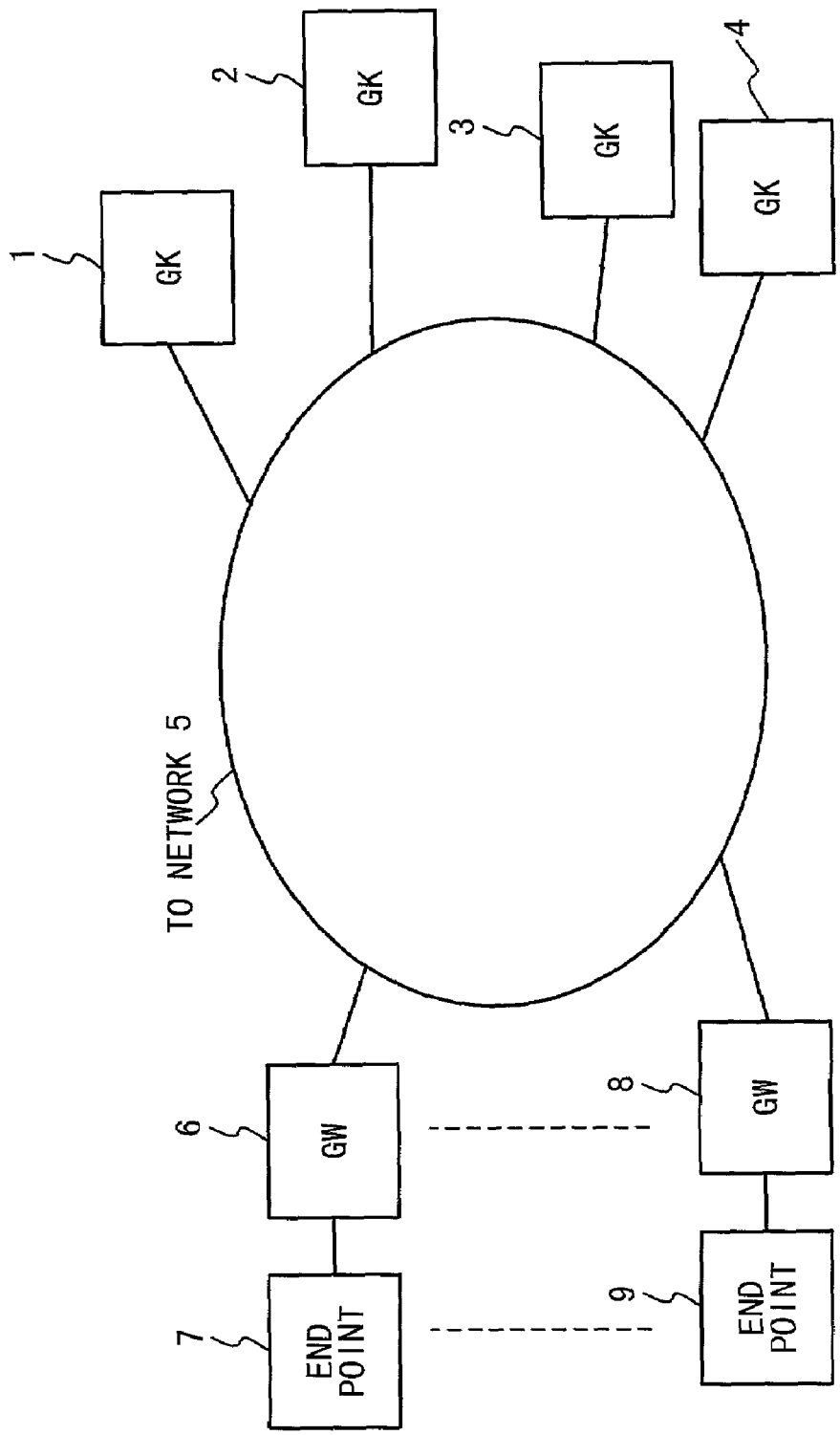
FIG. 1 is a diagram showing an example of the configuration of an H323 network to which a gatekeeper according to an embodiment of the present invention is applied.

FIG. 1 shows an example of the outline configuration of an H323 network to which the gatekeeper according to the embodiment of the present invention is applied. As shown in FIG. 1, the H323 network in this embodiment is composed of four gatekeepers GK 1 to GK 4, a network 5 connected with the gatekeepers GK 1 to GK 4, a plurality of gateways (GWs) 6 and 8 connected with network 5, and end points 7 and 9 respectively connected with the plurality of gateways 6 and 8. The configuration of the H323 network in this embodiment is composed of an element group which is based on the H323 recommendation. It should be noted that as in this embodiment shown in FIG. 1, the end point is connected with the network through the gateway. However, the present invention is not limited to this, and the end point may be connected directly with the network.

Figure 2:
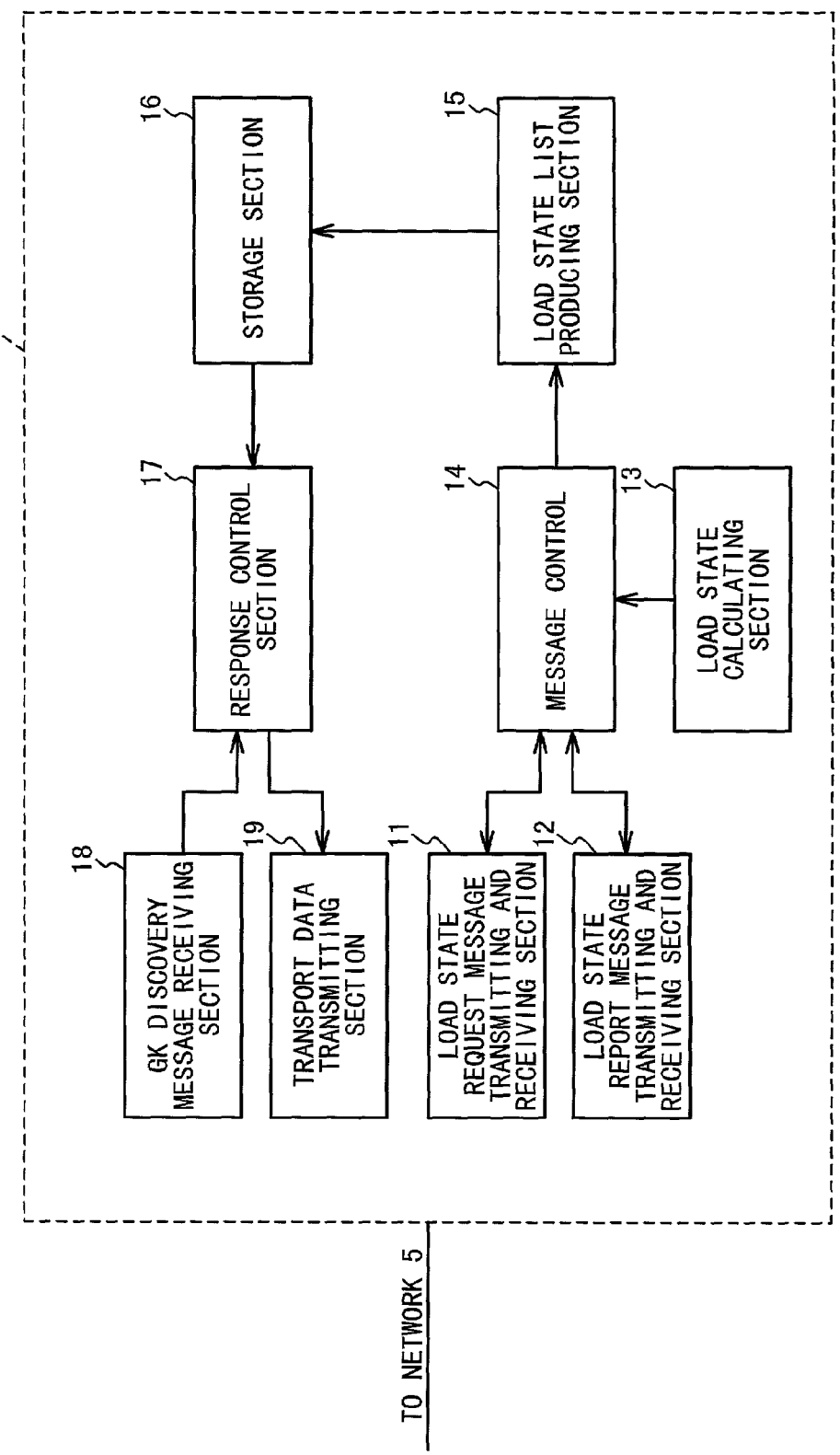
FIG. 2 is a block diagram showing the configuration of the gatekeeper according to the embodiment of the present invention.

FIG. 2 is a block diagram showing the configuration of the gatekeeper according to the embodiment of the present invention. As shown in FIG. 1, in this embodiment, a case where the four gatekeepers GK 1 to GK 4 are connected to the network will be described. However, the gatekeepers GK 1 to GK 4 have completely the same configuration. Therefore, only the configuration of the gatekeeper GK 1 will be described with reference to FIG. 2.

As shown in FIG. 2, the gatekeeper GK 1 is composed of s load state request message transmitting and receiving section 1, a load state data notice message transmitting and receiving section 12, a load state calculating section 13, a message control section 14, a load state list generating section 15, a memory section 16, a reply control section 17, a gatekeeper (GK) discovery message receiving section 18, and a transport data transmitting section 19.

The load state request message transmitting and receiving section 11 carries out a process of receiving a load state request message from one of the gatekeepers GK 2 to GK 4 and a process of transmitting a load state request message to other gatekeepers GK 2 to GK 4. The load state data message transmitting and receiving section 12 carries out a process of receiving a load state data notice message from one of gatekeepers GK 2 to GK 4 and a process of transmitting a load state data message to other gatekeepers GK 2 to GK 4. The load state calculating section 13 calculates the load state of the gatekeeper GK 1. The message control section 14 extracts the received load state data notice message or the received load state request message and compares a load state contained in the received load state request message with the calculated load state of the gatekeeper GK 1. The load state list generating section 15 generates a load state list based on the comparing results of the calculated load state of the gatekeeper GK 1 and the load states contained in the received load state request messages or load state notice messages. The memory section 16 stores the load state list generated by the load state list generating section 15. The reply control section 17 controls transmission of a reply to an end point based on the load state list stored in the memory section 16. The gatekeeper (GK) discovery message receiving section 18 receives a gatekeeper (GK) discovery message from the end point. The transport data transmitting section 19 transmits transport data to the end point under the control of the reply control section 17.

It should be noted that in this embodiment, the load state request message uses a position data request message (LRQ), which is defined in the H323 recommendation, and the load state data message uses a position data response message (LCF), which is defined in the H323 recommendation. Also, the gatekeeper (GK) discovery message is GRQ in the H323 recommendation and the transmission of the transport data is carried out by use of GCF in the H323 recommendation.

Next, an operation of the gatekeeper in this embodiment will be described below. As shown in FIG. 1, there are the four gatekeepers GK 1 to GK 4 on the H323 network. Also, it is supposed that the load state is 30% for the gatekeeper G1, the load state is 10% for gatekeeper G2, the load state is 40% for the gatekeeper G3, and the load state is 20% for the gatekeeper G4. In this situation, the operation of the gatekeeper G1 will be mainly described. It should be noted that the load state is a ratio of the number of actual registrations to the maximum number of registrations which can be registered on each gatekeeper (GK).

In the gatekeeper GK 1, the message control section 14 controls the load state request message transmitting and receiving section 11 to transmit a load state request message from the load state request message transmitting and receiving section 11 to each of the gatekeepers GK 2 to GK 4 other than itself. For example, this process is desirable to be periodically executed to acquire the latest load states of the other gatekeepers GK 2 to GK 4. Also, the message control section 14 may refer to a gatekeeper list stored in the memory section 16 to determine the gatekeepers GK 2 to GK 4. The respective gatekeepers GK 2 to GK 4 carry out the same process as the gatekeeper GK 1.

For the load state request message, a position data request (LRQ) message is used in case of H323 recommendation, and the load state of the gatekeeper GK 1 is set as a nonstandard parameter of the LRQ message. Thus, the LRQ message is transmitted to the other gatekeepers GK 2 to GK 4.

Also, in the transmission of the load state request message, a code indicating that a position data request (LRQ) message is an inquiry of the load state is set as gatekeeperIdentifier of the position data request (LRQ) message. It should be noted that the data of the gatekeeper GK 1 is set as the transmitter data.

Each of the gatekeepers GK 2 to GK 4 receives the LRQ message as the load state request message from the gatekeeper GK 1 and recognizes that the LRQ message inquires the load state, based on the gatekeeperIdentifier of the received LRQ message. Then, in each of the gatekeepers GK 2 to GK 4 as a concerned gatekeeper, the message is received by the load state request message transmitting and receiving section 11 and the message control section 11 takes out the load state of the transmission source gatekeeper GK 1 from the nonstandard parameter of the LRQ message. The load state calculating section 13 calculates the load state of the concerned gatekeeper (GK).

Next, in each of the gatekeepers GK 2 to GK 4, the message control section 14 compares the calculated load state and the taken out load state. When the load state of the concerned gatekeeper is lighter, the message control section 14 of the concerned gatekeeper (GK) sets the load state of the concerned gatekeeper (GK) to a nonstandard parameter of the position data replying (LCF) message as the load state notice message. Then, the message control section 14 controls the load state notice message transmitting and receiving section 12 to transmit the load state notice message to the transmission source gatekeeper (GK) of the load state request message (in this example, to the gatekeeper GK 1). At this time, the message control section 14 of the gatekeeper (GK) sets an identifier of the concerned gatekeeper as the message originator data of the load state notice message. However, when the end point cannot be accommodated, the concerned gatekeeper (GK) discards the received load state request message and does not reply to the message.

Also, when the load state of the concerned gatekeeper (GK) is equal to or higher than the load state of the transmission source gatekeeper GK 1 of the load state request message, the gatekeeper (GK) discards the received load state request message and does not reply to the message.

As described above, in this embodiment, it is supposed that the load state of gatekeeper GK 1 is 30%, the load state of the gatekeeper GK 2 is 10%, the load state of the gatekeeper GK 3 is 40%, and the load state of the gatekeeper GK 4 is 20%. Therefore, when receiving the load state request message from the gatekeeper GK 1, the gatekeeper GK 2 transmits the load state data notice message to the gatekeeper GK 1. However, when receiving the load state request message from the gatekeeper GK 1, the gatekeeper GK 3 discards the received load state request message and does not reply. When receiving the load state request message from the gatekeeper GK 1, the gatekeeper GK 4 transmits the load state data message to the gatekeeper GK 1.

When receiving the load state data notice message by the load state data notice message transmitting and receiving section 12 from the gatekeeper GK 2, the message control section 14 of the gatekeeper GK 1 extracts the load state of the gatekeeper GK 2 from the nonstandard parameter of the LCF message as the received load state data message. The load states of the gatekeepers GK 2 and GK 4 are notified with the load state data messages in this way.

The load state of the gatekeeper GK 1 is calculated by the load state calculating section 13 and transferred to the message control section 14, which compares the calculated load state of the gatekeeper GK 1 with the extracted load state. When the extracted load state is lighter than the calculated load state, the message control section 14 outputs the identifier of the received message to the load state list generating section 15. When the processing to the messages from all the gatekeepers GK 2 to GK 4 is ended, the load state list generating section 15 generates a load state list and stores in the memory section 16.

The present load states of the gatekeepers are arranged in a lower order in the load state list. In this case, because the load state of gatekeeper GK 3 is higher than the load state of the gatekeeper GK 1 as described above, the gatekeeper GK 3 does not reply to the load state request message from the gatekeeper GK 1. Therefore, the gatekeeper GK 1 cannot know the load state of the gatekeeper GK 3 and the load state of the gatekeeper GK 3 is not written in the load state list stored in the memory section 16 of the gatekeeper GK 1. However, any gatekeeper (GK) whose identifier is not written in the load state list has the load state heavier than that of the gatekeeper GK 1. Therefore, this is not a problem for the purpose to find a gatekeeper (GK) with a lighter load state. That is, the gatekeeper GK 1 does not receive the load state data notice message from the gatekeeper GK 3 and there is not the identifier of the gatekeeper GK 3 in the load state list. Thus, the gatekeeper GK 1 can know that the load state of the gatekeeper GK 3 is heavier than the load state of the gatekeeper GK 1.

As described above, the load state list generating section 15 of the gatekeeper GK 1 generates the load state list and stores in the memory section 16. The reply control section 17 refers to the load state list when the gatekeeper discovery message is received from the end point 7 or 9 and determines whether transport data should be transmitted to the end point 7 or 9.

In more specifically, in the gatekeeper GK 1, when receiving the gatekeeper (GK) discovery message (GRQ) from the end point 7 or 9 by the gatekeeper discovery message receiving section 18, the reply control section 17 refers to the load state list stored in the memory section 16 and determines whether or not the gatekeeper GK 1 has the lightest load state among the gatekeepers GK 1 to GK 4. If the load state of the gatekeeper GK 1 is the lightest, the reply control section 17 of the gatekeeper GK 1 controls the transport data transmitting section 19 to transmit the transport data to the end point 7 or 9 which has issued the gatekeeper discovery message. Also, the reply control section 17 controls the transport data transmitting section 19 not to transmit the transport data, if the load state of the gatekeeper GK 1 is not the lightest. As described above, when the load state of the gatekeeper GK 1 is 30%, the load state of the gatekeeper GK 2 is 10%, the load state of the gatekeeper GK 3 is 40%, and the load state of the gatekeeper GK 4 is 20%. Therefore, the load state of the gatekeeper GK 1 is not the lightest. Thus, the transmission of the transport data is not carried out.

On the other hand, when there is no reply from the gatekeepers GK 2 to GK 4 although the gatekeeper GK 1 transmits the load state request message to the other gatekeepers GK 2 to GK 4, the load state of the gatekeeper GK 1 is the lightest, compared with other gatekeepers GK 2 to GK 4. Therefore, when receiving the gatekeeper (GK) discovery message from the end point 7 or 9, the reply control section 17 of the gatekeeper GK 1 controls the transport data transmitting section 19 to transmit the transport data of the gatekeeper (GK) to the transmission source of the gatekeeper (GK) discovery message.

As described above, according to the present invention, it can be prevented that the load of the processing for an end point centers on a specific one of the gatekeepers in the H323 network so that the efficiency is degraded. Thus, it is possible for the load to be efficiently distributed. That is, according to the present invention, each gatekeeper (GK) connected with the network previously checks the load states of the gatekeepers (GK), and transmits the transport data in response to the gatekeeper (GK) discovery message from the end point, only when the load state of the gatekeeper (GK) is the lightest. Therefore, the leaning of the load can be eliminated between the plurality of gatekeepers (GKs) connected with the network, and the gatekeeper (GK) can be effectively used.

What is claimed is:

1. A gatekeeper connected to an H323 network, comprising:
    a first message receiving section which receives a gatekeeper discovery message from an end point;
    a transport data transmitting section; and
    a control section which comprises a load state notice message transmitting section, and:
        autonomously monitors a load state of another gatekeeper in said network by receiving a message from said another gatekeeper, said message comprising a load state of said another gatekeeper;
        upon said first message receiving section receiving said gatekeeper discovery message, refers to a load state list to determine whether said gatekeeper has the lightest load among a plurality of gatekeepers including said gatekeeper;
        controls said transport data transmitting section to transmit transport data to said end point in response to the gatekeeper discovery message, when it is determined that said gatekeeper has the lightest load; and
        controls said load state notice message transmitting section to transmit a load state of said gatekeeper in response to a load state request message received from said another gatekeeper when it is determined that said gatekeeper has the lightest load, and not transmit said load state of said gatekeeper in response to said load state request message, when it is determined that said gatekeeper does not have the lightest load.

2. The gatekeeper according to claim 1, wherein said control section controls said transport data transmitting section not to transmit transport data in response to the gatekeeper discovery message, when it is determined that said gatekeeper does not have the lightest load.

3. The gatekeeper according to claim 1, wherein said control section comprises:
   a storage section which stores said load state list indicative of existence of any of said plurality of gatekeepers having lighter loads taxi said gatekeeper; and
   a first control section which refers to said load state list to determine whether said gatekeeper has the lightest load among said plurality of gatekeepers including said gatekeeper, and controls said transport data transmitting section to transmit transport data to said end point in response to the gatekeeper discovery message, when it is determined that said gatekeeper has the lightest load.

4. The gatekeeper according to claim 3, wherein said control section further comprises: a load state notice message receiving section which receives a load state notice message from another gatekeeper of said plurality of gatekeepers as a notice transmitting gatekeeper, said load state notice message including a load of said notice transmitting gatekeeper;
   a calculating section which calculates a load of said gatekeeper as a self-load; and
   a second control section which extracts the load of said notice transmitting gatekeeper from said load state notice message, and compares the extracted load and the self-load, and writes an identifier of said notice transmitting gatekeeper at least into said load state list, when the extracted load is lighter than the self-load.

5. The gatekeeper according to claim 4, wherein said control section further comprises:
   a load state request message transmitting section,
   wherein said second control section controls said load state request message transmitting section to transmit a load state request message with an identifier of said gatekeeper and said self-load to other gatekeepers of said plurality of gatekeepers, and
   wherein said other gatekeepers selectively reply by transmitting a load state notice message to said gatekeeper based on a load of said other gatekeepers.

6. The gatekeeper according to claim 4, wherein said control section further comprises:
   a load state request message receiving section which receives said load state request message with an identifier of said other gatekeepers and the load of said other gatekeepers, and
   wherein said second control section extracts the load of said other gatekeepers from said load state request message, and compares the extracted load and the load of said gatekeeper as a self-load, and controls said load state notice message transmitting section to transmit a load state notice message with the self-load and said identifier of said gatekeeper to said other gatekeepers, when the extracted load is not lighter than the self-load.

7. The gatekeeper according to claim 6, wherein said second control section discards said load state request message, when the extracted load is lighter than the self-load.

8. A load distributing method in a communication system which comprises a network, an end point operatively connected to said network, and a plurality of gatekeepers including first and second gatekeepers, said method comprising:
   in said first gatekeeper:
   autonomously monitoring a load state of said second gatekeeper by receiving a message from said second gatekeeper, said message comprising a load state of said second gatekeeper;
   receiving a gatekeeper discovery message from said end point;
   upon a first message receiving section receiving said gatekeeper discovery message, referring to a load state list which indicates identifiers of gatekeepers in said plurality of gatekeepers having lighter loads, to determine whether said first gatekeeper has the lightest load among said plurality of gatekeepers;
   transmitting transport data to said end point in response to said gatekeeper discovery message in said first gatekeeper, when it is determined that said first gatekeeper has the lightest load; and
   transmitting a load state of said first gatekeeper in response to a load state request message received from said second gatekeeper when it is determined that said first gatekeeper has the lightest load, and not transmitting said load state of said first gatekeeper in response to said load state request message, when it is determined that said first gatekeeper does not have the lightest load.

9. The load distributing method according to claim 8, further comprising:
   ignoring said gatekeeper discovery message, when it is determined that said first gatekeeper does not have the lightest load.

10. The load distributing method according to claim 8, further comprising:
    calculating a load of said first gatekeeper as a first load;
    receiving a load state notice message including a load of said second gatekeeper as a second load from said second gatekeeper;
    extracting said second load from said load state notice message;
    comparing said first load and said second load; and
    writing an identifier of said second gatekeeper into said load state list, when said second load is lighter than said first load.

11. The load distributing method according to claim 10, further comprising:
    transmitting a load state request message with an identifier of said first gatekeeper and said first load to said second gatekeeper.

12. The load distributing method according to claim 10, further comprising:
    receiving said load state request message with an identifier of said second gatekeeper and said second load;
    extracting said second load from said load state request message;
    comparing the extracted second load and said first load; and
    transmitting said load state notice message with said first load and said identifier of said first gatekeeper to said second gatekeeper, when the extracted second load is not lighter than said first load.

13. The load distributing method according to claim 12, further comprising:
    discarding said load state request message, when the extracted second load is lighter than said first load.

14. The gatekeeper according to claim 1, wherein a load distribution is carried out to equalize a load autonomously between gatekeepers in said plurality of gatekeepers.

15. The gatekeeper according to claim 1, wherein said load comprises a ratio of a number of actual registrations to a maximum number of registrations which can be registered by said gatekeeper.

16. The gatekeeper according to claim 5, wherein said second control section controls said load state request message transmitting section to periodically transmit said load state request message.

17. The gatekeeper according to claim 1, wherein said control section controls said transport data transmitting section to transmit transport data to said end point in response to the gatekeeper discovery message only when it is determined that said gatekeeper has the lightest load.

18. The load distributing method according to claim 8, wherein said first gatekeeper is independent of said second gatekeeper and shares information with said second gatekeeper.

19. The load distributing method according to claim 8, wherein said first and second gatekeepers autonomously determine which of said first and second gatekeepers has a lightest load.

20. A packet network, comprising:
a plurality of gatekeepers, a gatekeeper in said plurality of gatekeepers comprising:
　a first message receiving section which receives a gatekeeper discovery message from an end point;
　a transport data transmitting section; and
　a control section which comprises a load state notice message transmitting section, and:
　　autonomously monitors a load state of another gatekeeper in said network by receiving a message from said another gatekeeper, said message comprising a load state of said another gatekeeper;
　　upon said first message receiving section receiving said gatekeeper discovery message, refers to a load state list to determine whether said gatekeeper has the lightest load among said plurality of gatekeepers;
　　controls said transport data transmitting section to transmit transport data to said end point in response to the gatekeeper discovery message, when it is determined that said gatekeeper has the lightest load; and
　　controls said load state notice message transmitting section to transmit a load state of said gatekeeper in response to a load state request message received from said another gatekeeper when it is determined that said gatekeeper has the lightest load, and not transmit said load state of said gatekeeper in response to said load state request message, when it is determined that said gatekeeper does not have the lightest load.

21. The gatekeeper according to claim 1, further comprising:
　a load state request message transmitting and receiving section for transmitting a load state request message to said another gatekeeper in said plurality of gatekeepers and receiving said load state request message from said another gatekeeper; and
　a load state notice message receiving section for receiving a load state notice message from said another gatekeeper.

22. The gatekeeper according to claim 21, wherein said control section further comprises:
　a load state calculating section for calculating a load state for said gatekeeper;
　a load state list generating section which generates said load state list;
　a memory section for storing said load state list; and
　a message control section which:
　　extracts a load state of said another gatekeeper from said load state request message of said another gatekeeper, compares said extracted load state of said another gatekeeper with said calculated load state of said gatekeeper, and when said calculated load state of said gatekeeper is less than said extracted load state of said another gatekeeper, causes said load state notice message transmitting and receiving section to transmit a load state notice message to said another gatekeeper; and
　　extracts a load state of said another gatekeeper from a load state notice message of said another gatekeeper, compares said extracted load state of said another gatekeeper with said calculated load state of said gatekeeper, and when said extracted load state of said another gatekeeper is less than said calculated load state of said gatekeeper, outputs an identifier of said load state notice message to said load state list generating section.

23. The gatekeeper according to claim 22, wherein said control section further comprises:
　a reply control section which:
　　refers to said load state list stored in said memory section when said gatekeeper discovery message is received from said end point to determine whether said gatekeeper has a lightest load state of said plurality of gatekeepers; and
　　if said gatekeeper has a lightest load state of said plurality of gatekeepers, causes said transport data transmitting section to transmit said transport data to said end point from which said gatekeeper received said gatekeeper discovery message.

24. The gatekeeper according to claim 21, wherein said load state request message comprises a position data request message (LRQ) as defined in the H323 recommendation, and
　wherein said load state notice message comprises a position data response message (LCF) as defined in the H323 recommendation.

25. The gatekeeper according to claim 24, wherein a load state of said gatekeeper is set as a nonstandard parameter of said position data request message (LRQ).

26. The gatekeeper according to claim 1, wherein said load state list comprises identifiers of other gatekeepers in said plurality of gatekeepers from which said gatekeeper received a load state notice message.

* * * * *